(12) United States Patent
Stenton et al.

(10) Patent No.: US 7,910,889 B2
(45) Date of Patent: Mar. 22, 2011

(54) WAVELENGTH-CONVERSION SYSTEM WITH A HEATED OR COOLED WAVELENGTH-CONVERSION TARGET

(75) Inventors: William Conrad Stenton, Midland (CA); Evan S. Cameron, Midland (CA)

(73) Assignee: Raytheon Company, Waltham, MA (US)

( * ) Notice: Subject to any disclaimer, the term of this patent is extended or adjusted under 35 U.S.C. 154(b) by 718 days.

(21) Appl. No.: 11/825,801

(22) Filed: Jul. 9, 2007

(65) Prior Publication Data

US 2009/0014656 A1   Jan. 15, 2009

(51) Int. Cl.
*G01J 5/16* (2006.01)
(52) U.S. Cl. .................................. 250/339.03
(58) Field of Classification Search ............... 250/338.1, 250/339.03, 339.04, 340, 341.1, 341.6, 352
See application file for complete search history.

(56) References Cited

U.S. PATENT DOCUMENTS

| | | | | |
|---|---|---|---|---|
| 2,879,424 A | * | 3/1959 | Garbuny et al. | 345/65 |
| 5,838,014 A | * | 11/1998 | Cabib et al. | 250/504 R |
| 7,511,273 B2 | * | 3/2009 | Killich et al. | 250/330 |
| 2004/0211900 A1 | | 10/2004 | Johnson | |
| 2008/0077203 A1 | * | 3/2008 | Malak | 607/96 |

FOREIGN PATENT DOCUMENTS

DE  102005018965 B3 * 10/2006
* cited by examiner

*Primary Examiner* — David P Porta
*Assistant Examiner* — David S Baker
(74) *Attorney, Agent, or Firm* — Haynes and Boone LLP

(57) ABSTRACT

A wavelength-conversion system includes a wavelength-conversion target that radiates an energy output when an energy input of a different wavelength is incident upon the wavelength-conversion target. An input structure directs the energy input of the input-energy wavelength to be incident upon the wavelength-conversion target. A target baseline temperature modifier either controllably heats or controllably cools the wavelength-conversion target independently of any heating or cooling effect of the energy input or the energy output. A detector is positioned so that the energy output of the output-energy wavelength emitted from the wavelength-conversion target is incident upon the detector.

15 Claims, 3 Drawing Sheets

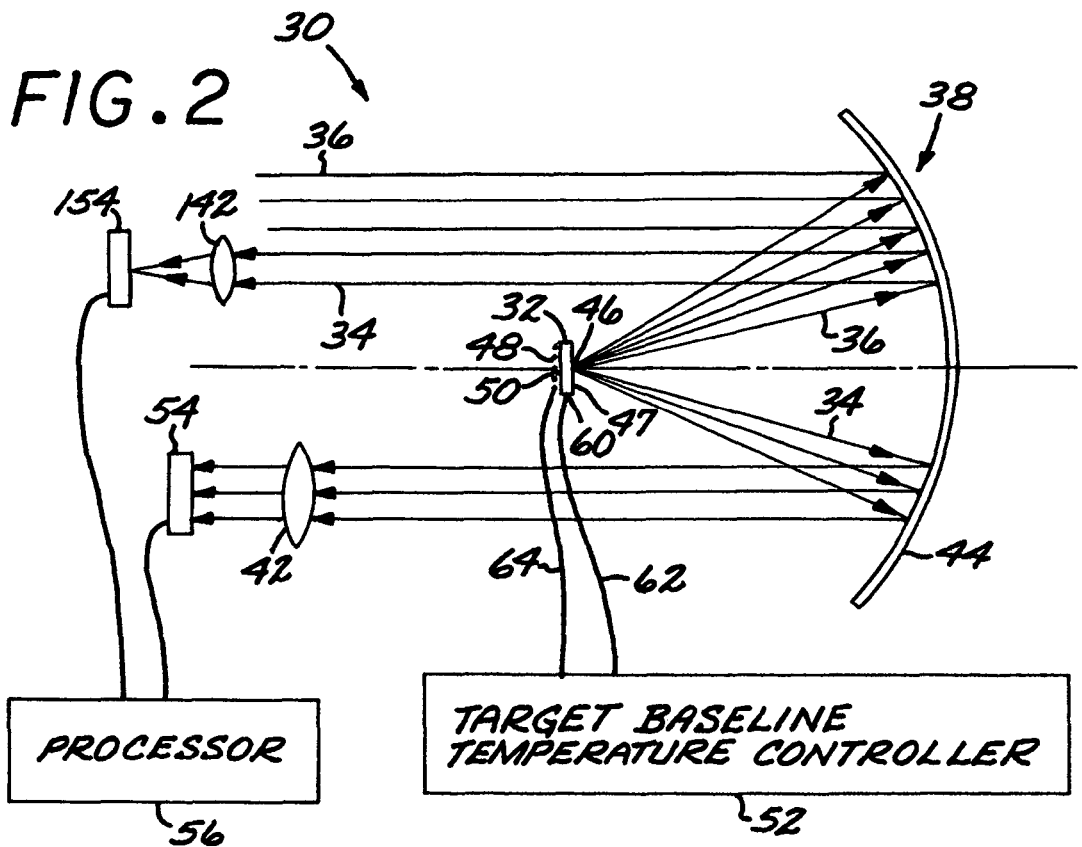
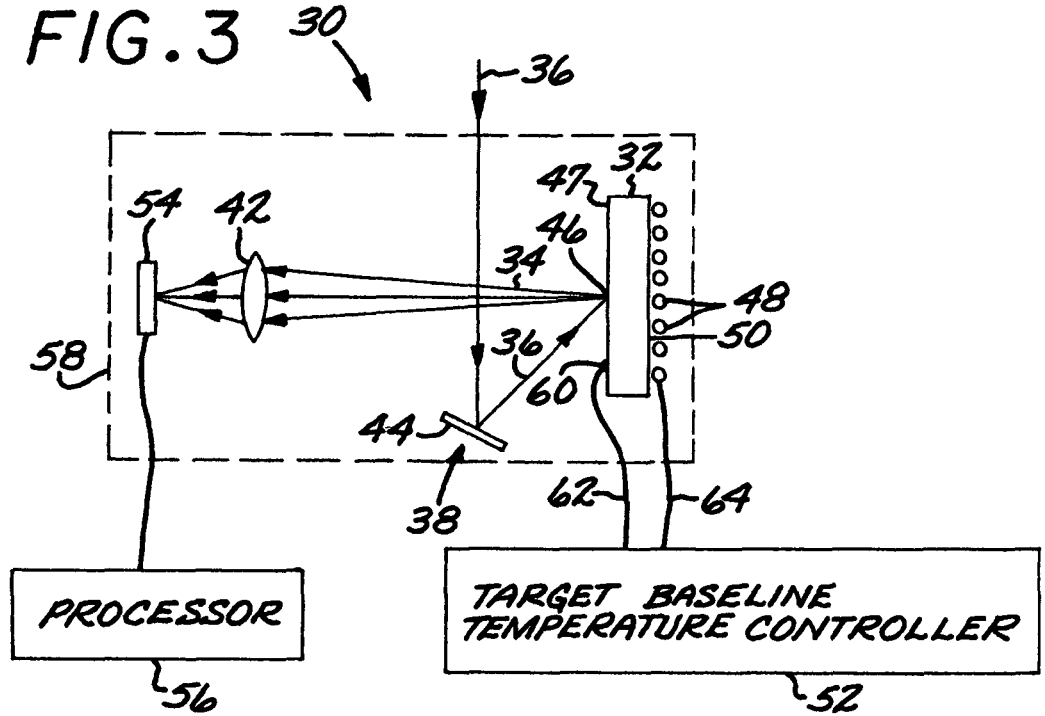

WAVELENGTH-CONVERSION SYSTEM WITH A HEATED OR COOLED WAVELENGTH-CONVERSION TARGET

This invention relates to a system that converts one wavelength to another wavelength using a wavelength-conversion target, and senses the converted wavelength with a detector. More particularly, the invention relates to such a system wherein the temperature of the wavelength-conversion target is controlled to ensure that the energy output of the wavelength-conversion target is readily sensed by the detector.

BACKGROUND OF THE INVENTION

The presence of a monochromatic laser beam must be detected in a variety of applications. In a direct-detection technique for sensing the monochromatic laser beam, the laser beam is directly incident upon the sensing elements of a detector. The detector converts the incident laser energy to an electrical signal for further processing.

However, there can be difficulties in applying this direct-detection approach. At some times the laser beam may have too low a power density for the detector and be undetectable, while at other times it may have too high a power density for the detector and damage the detector. Another problem is that the detector may not be optimized for the specific wavelength of the monochromatic laser beam.

An alternative approach is required that does not suffer from the shortcomings of the direct-detection technique. The present invention fulfills this need, and further provides related advantages.

SUMMARY OF THE INVENTION

In an indirect-detection technique for sensing the monochromatic infra-red laser beam, the laser beam is directed against a wavelength-conversion target. The wavelength-conversion target is heated by the laser beam and emits polychromatic thermal energy. The emitted thermal energy may be in the ultraviolet, visible, and/or infra-red wavelength ranges. The thermal energy emitted by the wavelength-conversion target is sensed by the detector. This approach avoids directing the laser beam directly onto the detector. It utilizes the detector to sense the thermal energy emitted by the wavelength-conversion target over a wide wavelength band, rather than in the narrow wavelength band of the monochromatic laser beam.

Although the indirect-detection technique may be useful at some temperatures, the inventors have found that it performs inconsistently or not at all at some ambient temperatures of interest. (As used herein, "ambient temperature" is the temperature of the environment or surroundings in which the wavelength-conversion target is operated.) In particular, when the wavelength-conversion target is operated at very low ambient temperatures, the apparatus does not always operate properly and in a predictable manner.

The present approach overcomes these problems with the indirect-detection technique by controlling the operation of the apparatus to negate the effects of operation at different ambient temperatures.

In accordance with the invention, a wavelength-conversion system includes a wavelength-conversion target that radiates an energy output of an output-energy wavelength when an energy input of an input-energy wavelength is incident upon the wavelength-conversion target. Preferably, the wavelength-conversion target radiates an infra-red energy output of an infra-red output-energy wavelength. A visible-energy output of a visible-energy wavelength may also be produced. The wavelength-conversion target is preferably, but not necessarily, made of a ceramic.

A target baseline temperature modifier is provided for the wavelength-conversion target. The target baseline temperature modifier either controllably heats or controllably cools the wavelength-conversion target independently of any heating or cooling effect of the energy input and the energy output, and independently of environmental heating or cooling. A detector is positioned so that the thermal energy output of the output-energy wavelength emitted from the wavelength-conversion target is incident upon the detector. In a case of particular interest, the detector is an infra-red detector.

An optional input structure directs an input-energy beam of the input-energy wavelength to be incident upon the wavelength-conversion target. The input structure may be of any operable type. The input structure may include an input mirror that directs the energy input to be incident upon the wavelength-conversion target. The input mirror may be, for example, a parabolic or other mirror that focuses the energy input upon the wavelength-conversion target. The input mirror may be a fold mirror that changes the direction of the input-energy beam. The input structure may also or instead include a window, other mirrors, and/or lenses, either alone or in combination with other structure such as the input mirror.

In the preferred application, the target baseline temperature modifier is a heater, such as an electrical heater in contact with the wavelength-conversion target. Alternatively, the target baseline temperature modifier may be a cooler, such as a cooling coil in contact with the wavelength-conversion target.

In a preferred embodiment, a wavelength-conversion system comprises a wavelength-conversion target that radiates a broadband energy output including an infra-red output-energy wavelength, when an infra-red energy input of an infra-red input-energy wavelength is incident upon the wavelength-conversion target. The infra-red output-energy wavelength is, in general, different from the infra-red input-energy wavelength. An input mirror structure directs the infra-red energy input beam of the infra-red input-energy wavelength to be incident upon the wavelength-conversion target. A target baseline temperature modifier for the wavelength-conversion target either controllably heats or controllably cools the wavelength-conversion target, independently of any heating or cooling effect of the infra-red energy input or the infra-red energy output. An infra-red detector is sensitive to the infra-red output-energy wavelength and is positioned so that the infra-red energy output of the infra-red output-energy wavelength emitted from the wavelength-conversion target is incident upon the detector. Other compatible features discussed herein may be used with this embodiment.

A method for performing wavelength conversion comprises providing a wavelength conversion system comprising a wavelength-conversion target that radiates an energy output of an output-energy wavelength when energy input of an input-energy wavelength is incident upon the wavelength-conversion target. The energy input increases a local target temperature of the wavelength-conversion target by an energy-input incremental target temperature in an illuminated area wherein the energy input is incident upon the wavelength-conversion target. An input structure directs the energy input beam of the input-energy wavelength to be incident upon the wavelength-conversion target. A target baseline temperature modifier is provided for the wavelength-conversion target. The target baseline temperature modifier either controllably heats or controllably cools the wavelength-conversion target independently of any heating or cooling effect of the energy input or the energy output. A detector is positioned so that the energy output of the output-energy wavelength emitted from the wavelength-conversion target is incident upon the detector. The detector has a noise-floor temperature that is a characteristic of the detector.

The method further includes adjusting the target baseline temperature of the wavelength-conversion target so that the target baseline temperature of the wavelength-conversion target plus the incremental target temperature is equal to or greater than the noise-floor temperature of the detector. In one embodiment, the target baseline temperature of the wavelength-conversion target is adjusted so that the target baseline temperature of the wavelength-conversion target is equal to or less than the noise-floor temperature of the detector. The step of adjusting typically includes the step of heating the wavelength-conversion target using the target baseline temperature modifier, but it could include the step of cooling the wavelength-conversion target using the target baseline temperature modifier. The wavelength-conversion system is operated. Other compatible features discussed herein may be used with this embodiment.

The wavelength-conversion target is operated at an ambient temperature. The wavelength-conversion target may work well at some ambient temperatures, particularly warmer ambient temperatures. However, it may not work well or at all when operated at reduced ambient temperatures such as encountered in far-northern or far-southern latitudes, at high altitudes, in space, or on cold winter days.

Under such cold ambient conditions, heating the wavelength-conversion target so that the sum of the target baseline temperature of the wavelength-conversion target plus the incremental target temperature is equal to or greater than the noise-floor temperature of the detector results in proper operation of the detector to detect the energy input is ensured. If the target baseline temperature is maintained below the noise-floor temperature, a high signal-to-noise ratio results.

The present approach thus achieves a reliable operation of the wavelength-conversion system with optimal signal-to-noise ratio. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 2 is a schematic depiction of a first embodiment of a wavelength-conversion system;

FIG. 3 is a schematic depiction of a second embodiment of a wavelength-conversion system;

DETAILED DESCRIPTION OF THE INVENTION

Figure 1:
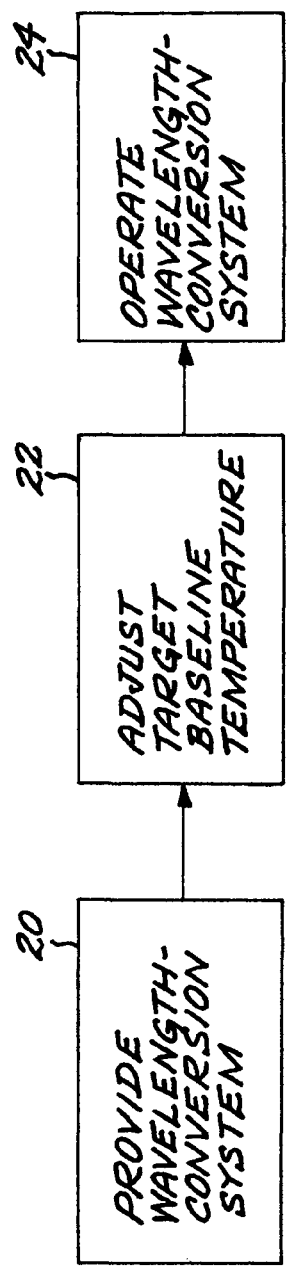
FIG. 1 depicts the steps of one embodiment of a method for performing wavelength conversion.

FIG. 1 depicts the steps of a method for performing wavelength conversion. A wavelength-conversion system 30 is provided, step 20 of FIG. 1. FIGS. 2-3 depict two embodiments of a wavelength-conversion system 20. FIGS. 2-3 illustrate a range of alternatives and features that may be used in the wavelength-conversion system 30, and the compatible features of the two figures may be used in either embodiment and in other embodiments. The wavelength-conversion system comprises a wavelength-conversion target 32 that radiates a radiated thermal energy output 34 of an output-energy wavelength when an energy input 36 of an input-energy wavelength is incident upon the wavelength-conversion target 32. The energy input 36 is typically a laser beam of an input-energy wavelength which may be an infra-red energy-input wavelength. As used herein, "wavelength" may include a single discrete wavelength or a range of wavelengths. The output-energy wavelength and the input-energy wavelength may be the same or different, and they may be in the ultra-violet, visible, or infra-red bands.

In the preferred embodiment, the wavelength-conversion target 32 radiates an infra-red energy output 34 of an infra-red output-energy wavelength when an infra-red energy input 36 of an infra-red input-energy wavelength is incident upon the wavelength-conversion target 32. (The wavelength-conversion target 32 may also simultaneously radiate energy of other wavelengths, but the infra-red energy output 34 is of particular interest.) The wavelength-conversion target 32 may be made of any operable material that is not unacceptably altered by the incidence of the energy input 36. Preferably, the wavelength-conversion target 32 is made of ceramic.

The wavelength-conversion system 30 has an input structure 38 that directs the energy input 36 of the input-energy wavelength to be incident upon the wavelength-conversion target 32. In the embodiments of FIGS. 2-3, the input structure 38 includes an input mirror 44 that directs the energy input 36 to be incident upon the wavelength-conversion target 32. In the embodiment of FIG. 2, the input mirror 44 is a curved, powered mirror, for example a parabolic or other shaped mirror, that focuses the energy input 36 onto an illuminated area 46 on a front side 47 of the wavelength-conversion target 32. The illuminated area 46 is typically smaller than the entire area of the front side 47 of the wavelength-conversion target 32, see FIG. 4. In the embodiments illustrated in FIGS. 2 and 3, there is a single input mirror 44, but there may be additional input mirrors or lenses that perform a comparable function. In the embodiment of FIG. 3, the input mirror 44 is a flat mirror that redirects the energy input 36 to be incident upon the illuminated area 46 on the front side 47 of the wavelength-conversion target 32, but in this case without any focusing effect. The wavelength-conversion system 30 may also be operated without an input mirror 44, by directing the energy input 36 directly onto the wavelength-conversion target 32. The input structure 38 may also include a mount 58, as shown for the embodiment of FIG. 3, that points the entire wavelength-conversion system 30 in the proper direction to receive the energy input 36 from that proper direction.

When the illuminated area 46 is illuminated and thence heated by the energy input 36, the thermal energy output 34 is responsively produced. The thermal energy output 34 may include ultraviolet, visible, and infra-red wavelengths.

The energy output 34 is incident upon a detector 54, which is typically an imaging detector. In the embodiment of FIG. 2, the energy output 34 first reflects from the input mirror 44 to form a collimated beam that is incident upon the detector 54. In the embodiment of FIG. 3, the energy output 34 is directly incident upon the detector 54. The detector 54 is selected to be sensitive to the wavelength of the thermal energy output 34. In the preferred applications, the detector 54 is selected to be sensitive to infra-red energy of the output-energy wavelength. The detector 54 may be operated in its own controlled environment, such as in a windowed cryostat in the case of some infra-red detectors.

In each of the embodiments of FIGS. 2-3 there is an optional optical system 42 that focuses the energy output 34 onto the detector 54. The optical system 42 is schematically represented by a single lens, but may include one or more lenses and/or one or more mirrors in addition to the input mirror 44.

There may be more than one detector and optical system, as for example a second detector 154 and a second optical system 142 operating with the processor 56 (or with a different processor), as shown in FIG. 2. The second detector 154 may be selected to operate at a different output-energy wavelength than the detector 54. For example, the detector 54 may be selected to operate at infra-red wavelengths, and the detector 154 may be selected to operate at visible wavelengths.

The wavelength-conversion system 30 has a target baseline temperature modifier 48 for the wavelength-conversion target 32, as illustrated in both FIG. 2 and FIG. 3. The target baseline temperature modifier 48 either controllably heats or controllably cools the wavelength-conversion target 32 in a controlled manner, as will be discussed more fully subsequently. The heating and cooling of the wavelength-conversion target 32 by the target baseline temperature modifier 48 is independent of any heating or cooling effect of the energy input 36 or the energy output 34, and independent of the heating or cooling of the wavelength-conversion target 34 by the ambient environment. That is, the energy input 36 that is incident upon the illuminated area 46 of the wavelength-conversion target 32 heats that illuminated area 46. The target baseline temperature modifier 48 is independent of, and operates independently of, such a heating by the energy input 36.

Figure 4:
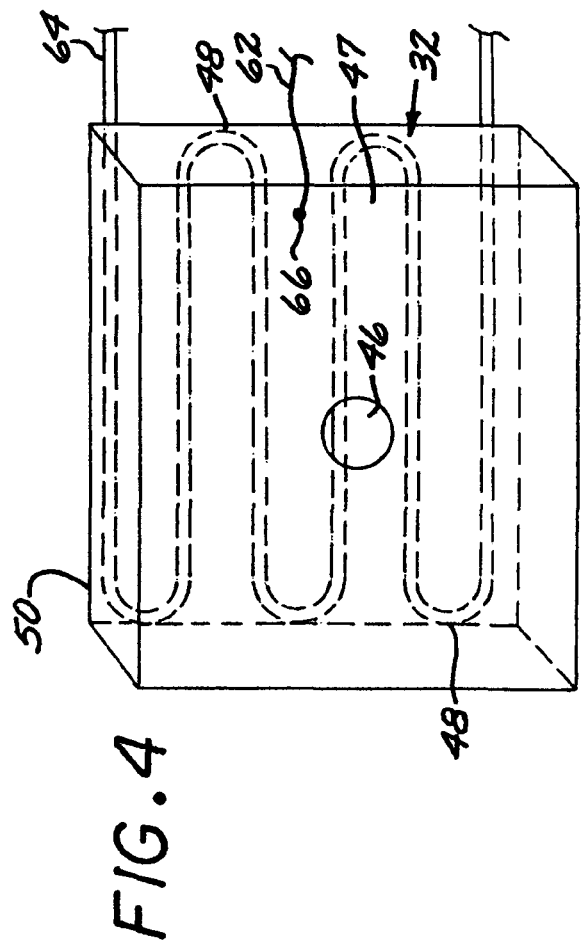
FIG. 4 is a schematic perspective view from a front side of the wavelength-conversion target.

In a typical application, the target baseline temperature modifier 48 is a heater contacting a back side 50 opposite to and remote from the front side 47 of the wavelength-conversion target 32, as illustrated in FIG. 4. The target baseline temperature modifier 48 may be, for example, an electrical heater in contact with the back side 50 of the wavelength-conversion target 32. Alternatively, the target baseline temperature modifier 48 may be a cooler contacting the back side 50 opposite to and remote from the front side 47 of the wavelength-conversion target 32. The target baseline temperature modifier 48 may be, for example, a cooling coil in contact with the back side 50 of the wavelength-conversion target 32. The heater form of the target baseline temperature modifier 48 is more typically required and is therefore the preferred form.

The target baseline temperature modifier 48 also includes a target baseline temperature controller 52 that measures and controls the target baseline temperature of the target 32. There is preferably a temperature measurement device 60, such as a thermocouple, that measures the baseline temperature of the wavelength-conversion target 32 and provides a temperature measurement signal 62 to the target baseline temperature controller 52, and a control line 64 that provides power to the target baseline temperature modifier 48 to heat or cool the wavelength-conversion target 32 or a control signal to a separate heater or cooler for the target baseline temperature modifier.

The target baseline temperature $T_{BL}$ is the temperature of the front side 47 of the wavelength-conversion target 32 measured when the target 32 is not illuminated by the energy input 36, as measured by a temperature-measuring device 66 such as a thermocouple, see FIG. 4. In the absence of any heating or cooling of the front side 47 of the wavelength-conversion target 32, $T_{BL}$ is the ambient temperature. When the illuminated area 46 is illuminated by the thermal energy input 36, it is heated above the target baseline temperature $T_{BL}$ by an amount termed the incremental target temperature change $\Delta T$. The sum of the target baseline temperature $T_{BL}$ and the incremental target temperature change $\Delta T$ is the temperature of the illuminated area 46, $T_{ILL}$. The general background temperature of the wavelength-conversion target is $T_{BL}$, and the illuminated area 46 (while illuminated) has a higher temperature $T_{ILL}$.

The detector 54 is selected to be sensitive to the output-energy wavelength of the energy output 34, infra-red energy in the preferred embodiment. The detector 54 typically converts the energy of the energy output 34 to an electrical signal, which is provided to a processor 56.

The detector 54 is characterized by a noise-floor temperature $T_{NF}$. The noise-floor temperature $T_{NF}$ is a property of the detector 54. An area viewed by the detector 54, in this case the front side 47 of the wavelength-conversion target 32, has a local temperature for each area. The noise-floor temperature $T_{NF}$ is the temperature of the area below which the detector 54 does not sense the temperature of the area. That is, when the local temperature of the area, in this case the wavelength-conversion target 32, is below the noise-floor temperature $T_{NF}$ of the detector 54, the local area is not visible to the detector 54.

Returning to FIG. 1, the method includes the further step 22 of adjusting the target baseline temperature $T_{BL}$ of the wavelength-conversion target 32 so that the target baseline temperature $T_{BL}$ of the wavelength-conversion target plus the incremental target temperature change $\Delta T$, equal to $T_{ILL}$, is greater than the noise-floor temperature $T_{NF}$ of the detector 54. This adjustment is made with the target baseline temperature modifier 48, as discussed earlier. The adjustment may involve either heating or cooling the wavelength-conversion target 32 as appropriate, but most typically involves heating. After the adjustment 22 is made, the wavelength-conversion system 30 is operated, step 24 of FIG. 1, so that the energy input 36 is incident upon the wavelength-conversion target 32, and the emitted energy output 34 is incident upon, and sensed by, the detector 54.

Figure 5:
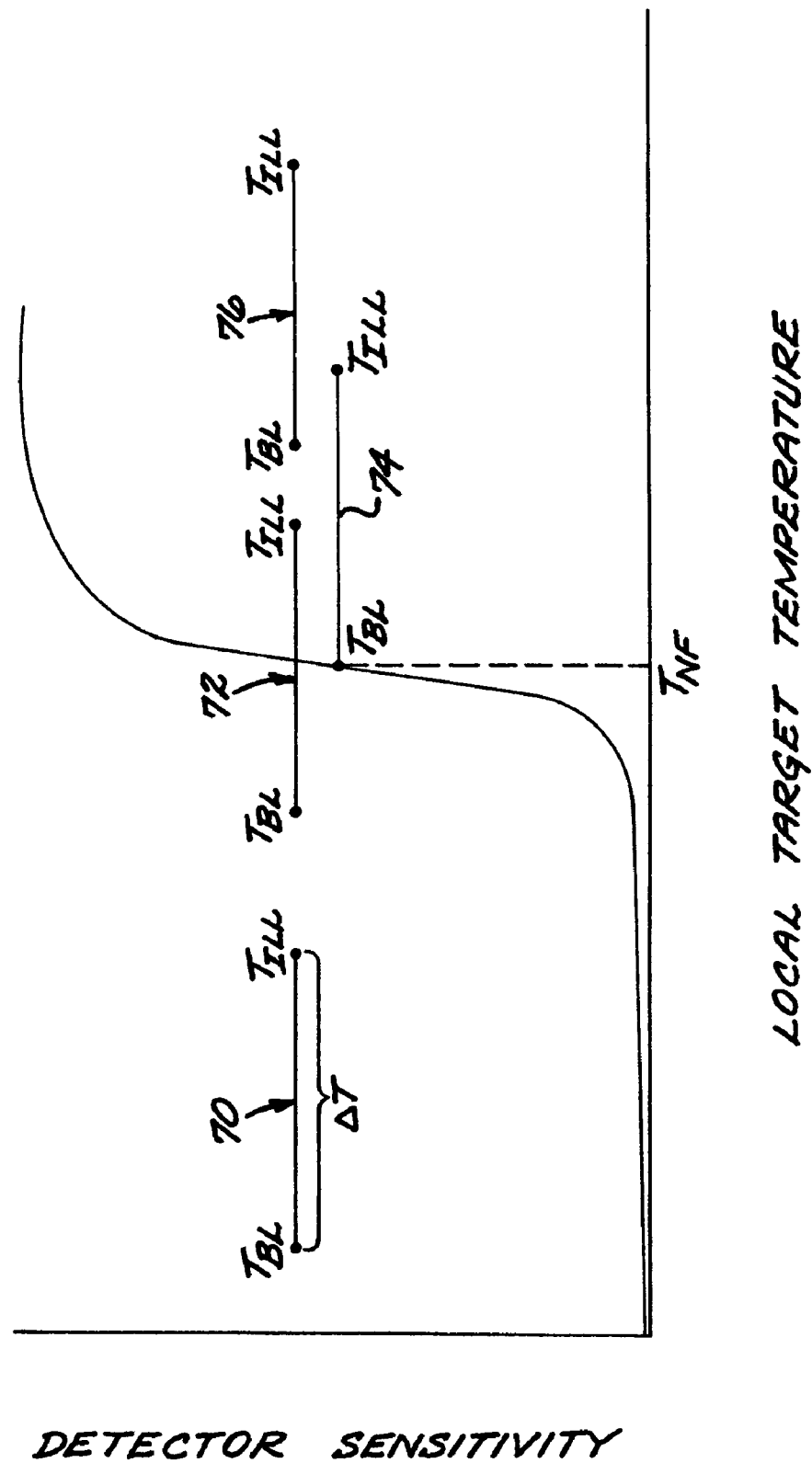
FIG. 5 is a schematic graph of detector sensitivity as a function of local target temperature.

FIG. 5 graphically illustrates the effect of applying the present approach. FIG. 5 is a graph of the sensitivity of the detector 54 to the temperature of the area it is viewing. At low temperatures of the viewed area, there is very little sensitivity of the detector 54, and the area cannot be viewed. With increasing temperature, upon reaching the noise-floor temperature $T_{NF}$ the sensitivity of the detector 54 increases dramatically. At higher temperatures, the sensitivity of the detector 54 is high, and the viewed area is readily sensed.

The relevant temperatures of the wavelength-conversion target 32 are the target baseline temperature $T_{BL}$, the incremental target temperature change $\Delta T$ that is the increase in the target temperature in the illuminated area 46 caused by the incident energy input 36, and the temperature of the illuminated area $T_{ILL}$ (equal to $T_{BL}+\Delta T$). These relations may be represented by a horizontal line, with $T_{BL}$ the lower temperature (left end of each respective line in FIG. 5) and $T_{ILL}$ the higher temperature (right end of each respective line), separated by the amount $\Delta T$.

For a first case 70 that is not within the scope of the present invention, the target baseline temperature $T_{BL}$ is well below the noise-floor temperature of the detector 54, $T_{NF}$. This situation results from a very low ambient temperature of the wavelength-conversion target 32. Because $T_{BL}$ is so low, $T_{ILL}$ is well below $T_{NF}$, so that the illuminated area 46 is not visible to the detector 54 even when fully illuminated by the energy input 36. Stated otherwise, the energy input 36 cannot heat the illuminated area 46 to a sufficiently high temperature that it is above the noise-floor temperature of the detector 54, and therefore is substantially invisible to the detector 54.

The present invention was prompted by the case 70. The wavelength-conversion system 30 operated well when ambient temperature was room temperature and $T_{ILL}$ was therefore above $T_{NF}$. However, when the wavelength-conversion system 30 was placed into an environmental cold chamber, so that case 70 developed, the wavelength-conversion system 30 ceased to function.

The remaining cases 72, 74, and 76 are within the scope of the present invention and provide a solution for this problem, and all relate to a situation wherein the ambient temperature is the same as for case 70.

For a second case 72, the wavelength-conversion target 32 is heated by the target baseline temperature modifier 48 so that the target baseline temperature $T_{BL}$ is below $T_{NF}$, and the temperature of the illuminated area $T_{ILL}$ (when illuminated by the energy input 36) is above $T_{NF}$. The illuminated area 46 is therefore sensed by the detector 54, and the remaining area of the front side 47 of the wavelength-conversion target 32 is not sensed by the detector 54. This relation provides the highest signal-to-noise ratio of the various cases 72, 74, and 76 that are within the scope of the invention, because the background signal from the wavelength-conversion target 32 is not visible to the detector 54. This relation 72 is therefore the preferred approach.

For a third case 74, the target baseline temperature modifier 48 is adjusted to heat the wavelength-conversion target 32 to $T_{BL}$ about equal to $T_{NF}$, so that the background signal of the wavelength-conversion target 32 is just barely visible, and the illuminated area 46 is clearly visible at $T_{ILL}$.

For a fourth case 76, both $T_{BL}$ and $T_{ILL}$ are above $T_{NF}$, so that both the background of the front side 47 and the illuminated area 46 are fully visible. In this fourth case 76, it may be desirable to reduce the heating input to the target baseline temperature modifier 48, to reduce the temperatures to those of the second case 72 or the third case 74. In another situation, if the ambient temperature is the $T_{BL}$ shown in case 76, it may be desirable to cool the wavelength-conversion target 32 using the target baseline temperature modifier 48 as a cooling device, so that $T_{BL}$ is that shown for case 72 or case 74, to achieve a better signal-to-noise ratio for the detector 54. The present approach was developed because of low ambient temperatures, and the need to heat the wavelength-conversion target 32. But it is equally applicable to high ambient temperatures and the need to cool the wavelength-conversion target to improve the signal-to-noise ratio.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A wavelength-conversion system comprising:
   a wavelength-conversion target that radiates an energy output of an output-energy wavelength when an energy input of an input-energy wavelength is incident upon the wavelength-conversion target;
   a target baseline temperature modifier for the wavelength-conversion target, wherein the target baseline temperature modifier either controllably heats or controllably cools the wavelength-conversion target independently of any heating or cooling effect of the energy input or the energy output; and
   a detector positioned so that the energy output of the output-energy wavelength emitted from the wavelength-conversion target is incident upon the detector;
   wherein the wavelength-conversion target radiates an infra-red energy output of an infra-red output-energy wavelength when the energy input is incident upon the wavelength-conversion target.

2. A wavelength-conversion system comprising:
   a wavelength-conversion target that radiates an energy output of an output-energy wavelength when an energy input of an input-energy wavelength is incident upon the wavelength-conversion target;
   a target baseline temperature modifier for the wavelength-conversion target, wherein the target baseline temperature modifier either controllably heats or controllably cools the wavelength-conversion target independently of any heating or cooling effect of the energy input or the energy output; and
   a detector positioned so that the energy output of the output-energy wavelength emitted from the wavelength-conversion target is incident upon the detector;
   wherein the wavelength-conversion target is made of ceramic.

3. A wavelength-conversion system comprising:
   a wavelength-conversion target that radiates an energy output of an output-energy wavelength when an energy input of an input-energy wavelength is incident upon the wavelength-conversion target;
   a target baseline temperature modifier for the wavelength-conversion target, wherein the target baseline temperature modifier either controllably heats or controllably cools the wavelength-conversion target independently of any heating or cooling effect of the energy input or the energy output; and
   a detector positioned so that the energy output of the output-energy wavelength emitted from the wavelength-conversion target is incident upon the detector;
   wherein the detector is an infra-red detector.

4. The wavelength-conversion system of claim 3, wherein the detector converts energy of the output-energy wavelength into an electrical signal.

5. The wavelength-conversion system of claim 3, wherein the wavelength-conversion system further includes an input structure that directs the energy input of the input-energy wavelength to be incident upon the wavelength-conversion target.

6. The wavelength-conversion system of claim 3, wherein the wavelength-conversion system further includes an input structure that directs the energy input of the input-energy wavelength to be incident upon the wavelength-conversion target, and wherein the input structure comprises an input mirror that focuses the energy input upon the wavelength-conversion target.

7. The wavelength-conversion system of claim 3, wherein the wavelength-conversion system further includes an input structure that directs the energy input of the input-energy wavelength to be incident upon the wavelength-conversion target, and wherein the input structure comprises a parabolic mirror that focuses the energy input upon the wavelength-conversion target.

8. The wavelength-conversion system of claim 3, wherein the target baseline temperature modifier is a heater.

9. The wavelength-conversion system of claim 3, wherein the target baseline temperature modifier is an electrical heater in contact with the wavelength-conversion target.

10. The wavelength-conversion system of claim 3, wherein the target baseline temperature modifier is a cooler.

11. The wavelength-conversion system of claim 3, wherein the target baseline temperature modifier is a cooling coil in contact with the wavelength-conversion target.

12. A wavelength-conversion system comprising:
a wavelength-conversion target that radiates an infra-red energy output of an infra-red output-energy wavelength when an infra-red energy input of an infra-red input-energy wavelength is incident upon the wavelength-conversion target;
an input mirror structure that directs the infra-red energy input of the infra-red input-energy wavelength to be incident upon the wavelength-conversion target;
a target baseline temperature modifier for the wavelength-conversion target, wherein the target baseline temperature modifier either controllably heats or controllably cools the wavelength-conversion target independently of any heating or cooling effect of the infra-red energy input or the infra-red energy output; and
an infra-red detector sensitive to the infra-red output-energy wavelength positioned so that the infra-red energy output of the infra-red output-energy wavelength emitted from the wavelength-conversion target is incident upon the detector.

13. The wavelength-conversion system of claim 12, wherein the input mirror structure comprises a parabolic mirror that focuses the energy input upon the wavelength-conversion target.

14. The wavelength-conversion system of claim 12, wherein the target baseline temperature modifier is a heater.

15. The wavelength-conversion system of claim 12, wherein the target baseline temperature is a cooler.

* * * * *